United States Patent [19]
Zago

[11] Patent Number: 5,634,533
[45] Date of Patent: Jun. 3, 1997

[54] BRAKING DEVICE PARTICULARLY FOR BICYCLES AND MOTORCYCLES

[76] Inventor: Massimiliano Zago, Via Aprilis, 41, S. Quirino (Pordenone) 1- 33080, Italy

[21] Appl. No.: 232,042
[22] PCT Filed: Nov. 3, 1992
[86] PCT No.: PCT/IT92/00139
  § 371 Date: Aug. 8, 1994
  § 102(e) Date: Aug. 8, 1994
[87] PCT Pub. No.: WO93/09023
  PCT Pub. Date: May 13, 1993

[30] Foreign Application Priority Data

Nov. 4, 1991 [IT] Italy ................................. UD91A0186
Sep. 28, 1992 [IT] Italy ................................. PN92A0072

[51] Int. Cl.$^6$ ................................................. B62C 1/00
[52] U.S. Cl. ................................. 188/24.11; 188/85
[58] Field of Search ........................ 188/24.11, 24.12, 188/24.14, 24.15, 24.19, 24.22, 25, 24.21, 85

[56] References Cited

U.S. PATENT DOCUMENTS

| | | | |
|---|---|---|---|
| 486,464 | 11/1892 | Haag | 188/85 |
| 2,270,586 | 1/1942 | Jahant | 188/85 |
| 2,660,266 | 11/1953 | Maloney | 188/85 |

*Primary Examiner*—Robert J. Oberleitner
*Assistant Examiner*—C. T. Bartz
*Attorney, Agent, or Firm*—Galgano & Burke

[57] ABSTRACT

An intermittent impulse-type anti-lock braking device for bicycles and motorcycles, whose principal function is to prevent the front or the rear wheel from locking up when the rider actuates the brake lever. Said impulse-type intermittent device is made up of an eccentric wheel placed into motion by contact with the wheel of the vehicle. The eccentric wheel, connected to a lever, which has its fulcrum in, transmits the necessary alternating motion to the brake pad. In this manner, the pad is pressed against the rim of the wheel with an intermittent action instead of the continuous pressure that is provided by the braking systems which are currently on the market.

10 Claims, 3 Drawing Sheets

BRAKING DEVICE PARTICULARLY FOR BICYCLES AND MOTORCYCLES

TECHNICAL FIELD

This invention relates to a braking device for bicycles and motorcycles, whose principal function is to prevent the front or rear wheel from locking up when the rider actuates the brake lever.

It is known that in emergency circumstances resulting from a road surface that has been made slippery by rain or mud, or in emergency circumstances due to the unpredictable nature of traffic situations, the rider of a bicycle or motorcycle is often called upon to act extremely quickly to stop his vehicle in as small a space as possible and without losing control.

However, it is also known that the delicate equilibrium of two-wheeled vehicles does not always allow this goal to be reached. Instead, it frequently occurs that the rider loses control of his vehicle even though he has rapidly taken the proper steps to actuate the braking systems at his disposal; such failure to maintain control usually occurs when one of the wheels, most often, the front wheel, locks up.

To prevent this from occurring and to prevent the resulting physical harm that may occur to the passive victim of such an event (i.e. the rider), there is one way to solve the problem: modifying the braking system of the vehicle so that neither one of the wheels is allowed to lock up.

An improved braking device for bicycles is disclosed in EP-A-269547. According to this prior art the effectiveness of a brake is improved by actuating the same hydraulically. Pressurised oil is fed by a pump which is driven by a bicycle wheel. However this document does not provide any suggestion on how to prevent the braked wheel to lock up.

DISCLOSURE OF INVENTION

This result can be obtained by actuating a device which draws off a portion of wheel movement and transmits such movement through a transmission shaft to an eccentric element or cam which is connected to a small piston. This piston is in turn directly connected to a brake pad whose action has been made more efficient by the shape of the pad itself (hollow in the inside). In this way the braking action is not continuous as in the braking systems currently on the market, but instead is intermittent as a result of the intermittent action exerted by the piston on the brake pad. The basic feature of this discovery is that the wheel of the vehicle is the source of the braking force.

As will be illustrated later on, the motion that powers the system is mechanically drawn from the rotating tire; however, it must be emphasized that any and all cases in which motion is drawn from any bicycle or motorcycle wheel component, such as tires, rims, disc-brakes, hubs, accessories and other systems, even those that have been added for this specific purpose at any point on the wheel, herein defined as a rotating system, are to be considered as analogous and equivalent systems which are covered by this patent. Likewise, this discovery also covers transmissions systems, such as belts, shafts, flexible elements etc., that are different from the system illustrated herein, as well as any power take off methods, such as co-axial take-off, tangential, take-off etc., that are different from the method illustrated herein.

The effectiveness of the system described herein is enhanced by two important secondary factors: the force with which the rider pushes a knurled wheel against the tire when he actuates the brake lever, as well as the inertia with which the eccentric-piston assembly opposes the rotational movement of the wheel.

The primary purpose of the discovery described herein is to perfect a device that uses a wheel to draw motion from the wheel of the vehicle considered, bicycle or motorcycle, and that subsequently transmits such motion to a system, i.e. a shaft or a lever, including an eccentric, all this representing a mechanism which imparts an intermittent impulse to a brake pad.

Another purpose of this discovery is to perfect a device, according to the device described in the preceding paragraph, in which the wheel of the device draws motion from the rim or from the sidewall of the tire and the brake pad exerts its braking action on the rim of the wheel itself.

A further purpose of this discovery is to perfect an intermittent braking system using "single-caliper" brake levers or shoes that are alternatively thrust by a special wheel or cam when said wheel or cam is pressed into contact with the external surface of the tire. These "single-caliper" brake levers or shoes then directly transmit their motion to normal brake pads which directly act with an impulse-type action upon the rim of the bicycle/motorcycle wheel. This small wheel or cam, that is actuated by the brake lever on the handlebar, is able to simultaneously power two symmetric levers that hold the brake pads. This concept might be convenient most of all for bicycles and motorcycles which use a disc-brake. In fact, the above described system, instead of over the wheel, might be located over the disc-brake, being part of the caliper.

The other characteristics and advantages of this discovery are better described by a detailed description of a number of its concrete configurations. An approximate but not limiting illustration of these configurations can be found on the three attached tables of design, to wit:

Figure 1:
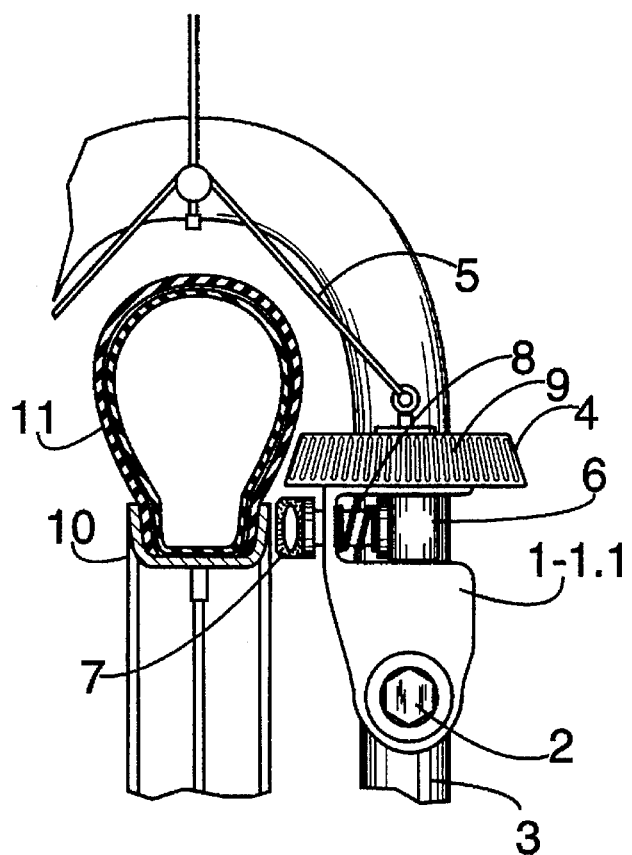
FIG. 1 shows a schematic side view of the front wheel of a bicycle with the intermittent braking device, taking off the motion from the tire and exerting its braking action on the rim.
Figure 2:
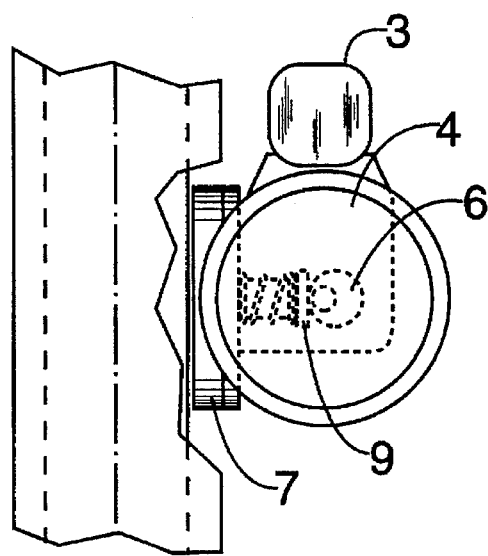
FIG. 2 shows a partial view of the device shown in FIG. 1.
Figure 5:
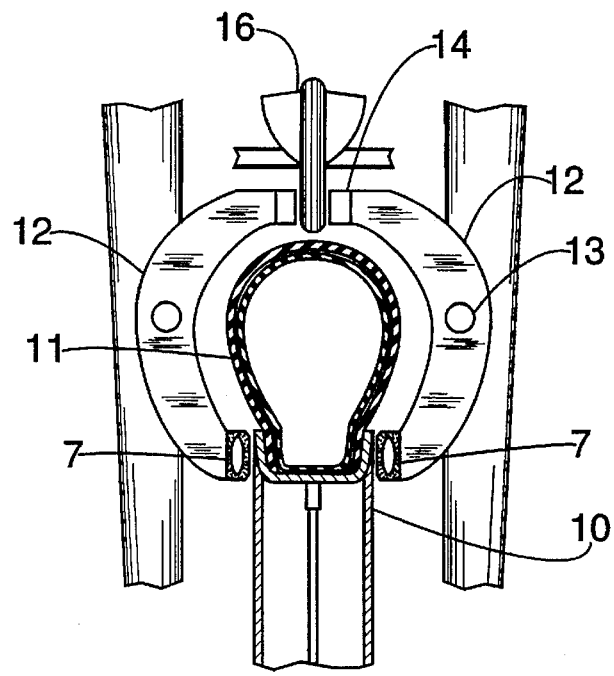
FIG. 5 shows a front view of the device illustrated in FIG. 4
Figure 3:
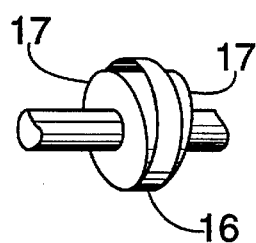
FIG. 3 shows an eccentric cam, as used in a second possible application of the discovery herein treated.
Figure 4:
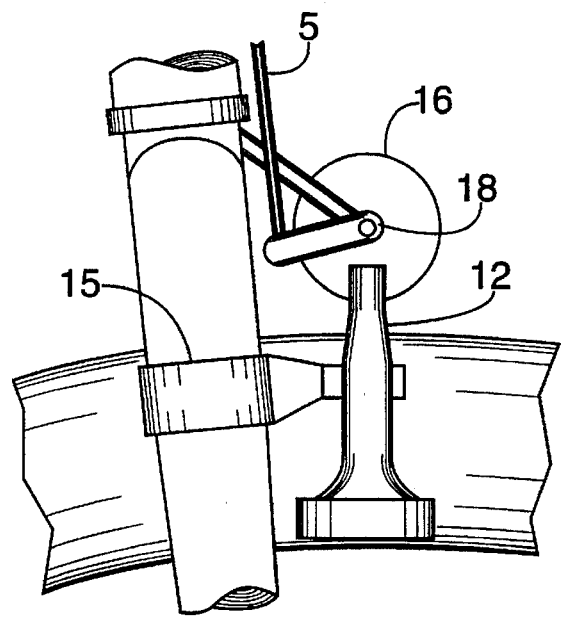
FIG. 4 shows a side view of the second above mentioned possible application, using two lever-type "mono-calipers"

A first configuration of the impulse-type intermittent braking device for bicycles and motorcycles, as defined by this invention, is installed on the front forks of a bicycle in the same position as traditional brakes. The device (1 or 1.1) is installed over (2) each branch of the fork, and the device is kept at a distance from each branch of the fork by a return spring. The cable (5) is pulled by the brake lever on the handlebar to actuate the device. Two versions of this device can be built: a simple type (1) which provides braking action only and a complex type (1.1, not shown), which has in addition a built-in generator that is used to signal braking action with a signal light.

As has already been pointed out in an approximate but not limiting example, the braking unit is installed over (2) the front fork (3). The braking unit is made up of a bearing structure that holds a brake pad (7) which moves at a right angle to the rim (10) of the wheel of the bicycle or motorcycle, and an eccentric or cam (6) that is directly moved by a serrated or knurled wheel (4). The eccentric is mounted at a right angle with respect to the axis of the small piston that moves the brake pad (7) and, to be more precise, that acts upon the stop (9).

In effect, the shaft that holds the brake pad (7) is constantly held against the eccentric by a return spring (8). The knurled wheel (4) is constructed of material that can draw motion from the sidewall of the tire (11), i.e. aluminum, without damage to the tire when the lever on the handlebar is pulled and the knurled wheel is brought into contact with the tire. When this occurs, motion from the tire is transferred through the knurled wheel to the eccentric, which in turn transmits the motion to the shaft that holds the brake pad. In the simplest application of this discovery, the brake pad is moved against and then drawn back from the rim of the bicycle/motorcycle wheel at each turn of the eccentric, thus generating the alternating motion that results in an intermittent braking action.

In an analogous way and using the same concept a second device is illustrated and described in FIGS. (3)–(4) and (5) in which a symmetrical "single-caliper" brake lever or shoe (12) is used on the right-hand and left-hand of the wheel of a bicycle/motorcycle. The special wheel or cam (16) is positioned above and along the center line of the tire (11). This special wheel or cam is symmetrically widened at the sides (17) and is actuated by the brake cable (5) and extension (18) by means of an arm which holds the wheel or cam against the circumference of the bicycle/motorcycle wheel; thus, the wheel or cam is moved by friction whenever the system is actuated with the bicycle/motorcycle wheel in motion. The two symmetrical lever-brake shoes (12) which are respectively installed over (13) and connected to (15) the two branches of the bicycle fork, are equipped with a brake pad (7) on one of their ends; this pad provides braking action on the rim of the wheel of the vehicle (10). The other end of the two symmetrical lever-brake shoes is equipped with an intermediate control terminal (14) that is moved at a right angle by the special wheel or cam (16) during braking. In fact, when the wheel or cam (16) turns the widened area at the side (17) moves the lever-brake shoe (12), thus pressing the brake pad (7) against the wheel rim (10). The resulting braking action is intermittent since the widened areas on the sides of the wheel or cam (16) are only present on a part of their lateral surfaces. Obviously, return springs will be provided to move the brake pads away from the wheel rim when the lever-brake shoe (12) is not being thrust by the cam or wheel (16). In this case, too, braking action is intermittent and the impulse-type action of the brake pad (7) on the wheel rim (10) prevents the tire from locking up, thus improving overall braking performance.

Figure 6:
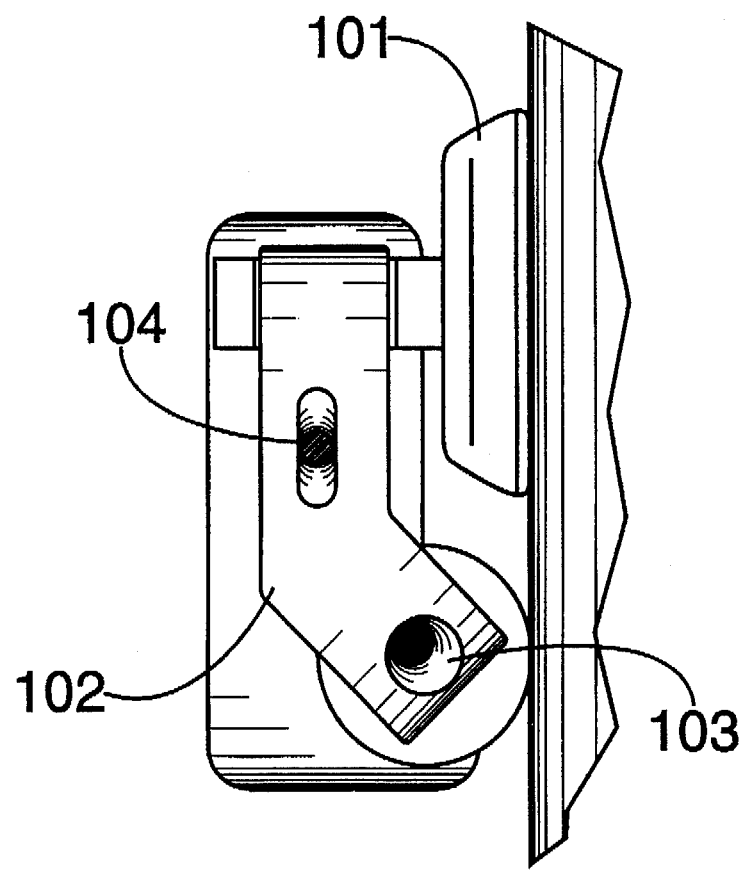
FIG. 6 shows a schematic view of a further configuration ready to operate illustrating a brake pad actuated by a lever coupled with an eccentric wheel.

Another concept included in this discovery is illustrated in FIG. 6. The lever (102) that has its fulcrum in (104) is connected at one end to the brake pad (101) and at the other end to the eccentric wheel (103). This, placed into motion by contact with the rim of the wheel, gives back an eccentric movement to the lever (102) which imparts an intermittent braking impulse on the pad (101). The fulcrum (104) can be mobile, by an appropriate mechanism, in order to regulate the position of the brake pad (101) due to its consumption.

Naturally, this invention is not limited to the sample applications described above; such examples merely represent a starting point for other configurations and methods for the creation of this type of system. In any event, the executive details can be varied without compromising the spirit of the invention as listed and claimed below.

I claim:

1. A braking device for a rotating shaft or wheel of a bicycle including at least one braking pad and a braking actuator for pressing said braking pad against a friction surface when said braking device is actuated, comprising means for intermittently applying the pressure exerted by said braking actuator to said braking pad such that said braking pad is alternatingly applied to said friction surface in intermittent fashion, wherein said intermittently pressure applying means are powered by said rotating shaft or wheel to be braked to transform the pressure exerted by said actuator into an intermittent pressure on said braking pad and said intermittently pressure applying means include a cam means driven by said wheel or shaft and acting on said brake pad to reciprocate it toward and away from said friction surface when said braking device is actuated.

2. A braking device according to claim 1, wherein said cam means include an actuating wheel connected to the braking actuator so as to be brought into contact with the wheel or shaft to be braked for rotation therewith upon actuation of said braking actuator, a cam coupled to said actuating wheel for rotation therewith, and a reciprocating plunger coupled to said cam and acting on said brake pad.

3. A braking device according to claim 2, wherein said actuating wheel is a serrated or knurled wheel.

4. A braking device according to claim 2, wherein said actuating wheel is comprised of aluminum.

5. A braking device for a rotating shaft or wheel of a bicycle including at least one braking pad and a braking actuator for pressing said braking pad against a friction surface when said braking device is actuated, comprising means for intermittently applying the pressure exerted by said braking actuator to said braking pad such that said braking pad is alternatingly applied to said friction surface in intermittent fashion, wherein said intermittently pressure applying means are powered by said rotating shaft or wheel to be braked and including a cam means driven by said wheel or shaft and acting on said brake pad to reciprocate it toward and away from said friction surface when said braking device is actuated, and wherein said braking actuator includes a caliper device pivotably mounted on a brake support, said caliper device having a first end bearing said brake pad and a second end mounted relatively to said cam means so as to be brought into contact with said cam means when said braking device is actuated.

6. A braking device according to claim 5, wherein said cam means includes a symmetrically widened wheel having a widened portion and which is disposed above and along a center line of said rotating shaft or wheel to intermittently apply pressure such that when said braking device is actuated, said symmetrically widened wheel rotates said widened portion through said caliper device causing said braking pad to press against said friction surface and then once said widened portion passes through said caliper device causing said braking pad to move away from said friction surface.

7. A braking device according to claim 6, wherein once said widened portion passes through said caliper device a return spring causes said braking pad to move away from said friction surface.

8. A braking device according to claims 1, 2, or 5 wherein said friction surface is a surface of a rim of the wheel to be braked.

9. A braking device for a bicycle wheel, including at least one braking pad and a braking actuator for pressing said braking pad against a rim of the wheel to be braked when said braking device is actuated, said braking device includes means for intermittently applying the pressure exerted by said braking actuator to said braking pad such that said braking pad is alternatingly applied to said rim of the wheel in intermittent fashion, wherein said intermittently pressure applying means are powered by said wheel to be braked to transform the pressure exerted by said actuator into an intermittent pressure on said braking pad and said intermittently pressure applying means include a cam means driven by said wheel and acting on said brake pad to reciprocate it toward and away from said rim of the wheel when said braking device is actuated.

10. A braking device according to claim 9, wherein said cam means include an actuating wheel connected to the braking actuator so as to be brought into contact with the wheel or shaft to be braked for rotation therewith upon actuation of said braking actuator, a cam coupled to said actuating wheel for rotation therewith, and a reciprocating plunger coupled to said cam and acting on said brake pad.

* * * * *